US011082607B2

(12) United States Patent
Ricci et al.

(10) Patent No.: US 11,082,607 B2
(45) Date of Patent: *Aug. 3, 2021

(54) SYSTEMS AND METHODS FOR GENERATING COMPOSITE DEPTH IMAGES BASED ON SIGNALS FROM AN INERTIAL SENSOR

(71) Applicant: RPX Corporation, San Francisco, CA (US)

(72) Inventors: Luca Ricci, Vienna (AT); Daniel Wagner, Vienna (AT); Jeroen Diederik Hol, Vienna (AT); Jakob Zillner, Los Angeles, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/899,398

(22) Filed: Jun. 11, 2020

(65) Prior Publication Data
US 2020/0322542 A1  Oct. 8, 2020

Related U.S. Application Data

(63) Continuation of application No. 16/254,574, filed on Jan. 22, 2019, now Pat. No. 10,686,980.

(51) Int. Cl.
*H04N 5/232* (2006.01)
(52) U.S. Cl.
CPC .............................. *H04N 5/232133* (2018.08)
(58) Field of Classification Search
CPC .......................... H04N 5/232133; G06T 19/00
See application file for complete search history.

(56) References Cited

U.S. PATENT DOCUMENTS 10,686,980 B1\* 6/2020 Ricci ................. H04N 5/232133
2011/0141227 A1  6/2011 Bigioi
(Continued)

FOREIGN PATENT DOCUMENTS

CN        102387374      3/2012
EP         3131060       2/2017
(Continued)

OTHER PUBLICATIONS

M. Nießner and A. Dai and M. Fisher, Combining Inertial Navigation and ICP for Real-time 3D Surface Reconstruction; Stanford University; 2014 (4 pages).
(Continued)

*Primary Examiner* — Twyler L Haskins
*Assistant Examiner* — Angel L Garces-Rivera
(74) *Attorney, Agent, or Firm* — Amin, Turocy & Watson, LLP

(57) ABSTRACT

Systems and methods for generating composite depth images are disclosed. Exemplary implementations may: capture, by a depth sensor, a set of depth images over a capture period of time; generate, by an inertial sensor, inertial signals that convey values of one or more inertial parameters characterizing motion of the depth sensor during the capture period of time; select a target capture position based on one or more of the capture positions of the set of depth images; generate, using the values of the one or more inertial parameters during the capture period of time, reprojected depth images; and generate a composite depth image by combining multiple depth images, such multiple depth images including a first re-projected depth image and a second re-projected depth image.

21 Claims, 4 Drawing Sheets

(56) References Cited

U.S. PATENT DOCUMENTS

| | | |
|---|---|---|
| 2014/0139639 A1 | 5/2014 | Wagner |
| 2015/0161818 A1 | 6/2015 | Komenczi |
| 2016/0212411 A1 | 7/2016 | Lindner |
| 2017/0053447 A1 | 2/2017 | Chen |
| 2017/0180639 A1 | 6/2017 | Kamilov |
| 2017/0230641 A1 | 8/2017 | Scavezze |
| 2017/0289515 A1 | 10/2017 | Li |
| 2018/0139431 A1 | 5/2018 | Simek |
| 2019/0014310 A1 | 1/2019 | Bradski |

FOREIGN PATENT DOCUMENTS

| | | |
|---|---|---|
| WO | 2017112800 | 6/2017 |
| WO | WO-2020154196 A1 | 7/2020 |

OTHER PUBLICATIONS

Tzu-Fei Chen a, Huan Chang b and Fuan Tsai; Integrating Depth Map and IMU Data for 3D Reconstruction From a Single Image; Aiming Smart Space Sensing; 2012 (8 pages).

"U.S. Appl. No. 16/254,574, Notice of Allowance dated Apr. 7, 2020", 9 pgs.

"International Application Serial No. PCT/US2020/014114, International Search Report dated Apr. 21, 2020", 2 pgs.

"International Application Serial No. PCT/US2020/014114, Written Opinion dated Apr. 21, 2020", 6 pgs.

\* cited by examiner

SYSTEMS AND METHODS FOR GENERATING COMPOSITE DEPTH IMAGES BASED ON SIGNALS FROM AN INERTIAL SENSOR

FIELD OF THE DISCLOSURE

The present disclosure relates to systems and methods for generating composite depth images. A composite depth image includes information from multiple depth images.

BACKGROUND

Depth sensors are known. Depth images as captured by a depth sensor are known. Inertial sensors are known. Determining the movement an object has made based on signals from an inertial sensor (coupled to the object) is known.

SUMMARY

One aspect of the present disclosure relates to a system configured for generating composite depth images, the method being implemented in a computer system that includes one or more hardware processors configured by machine-readable instructions. The system may include one or more hardware processors configured by machine-readable instructions. The system may be configured to capture, by a depth sensor, a set of depth images over a capture period of time. The set of depth images may include depth information. The depth information of the individual depth images may indicate distance from capture positions of the set of depth images to surfaces viewable from the capture positions. The set of depth images may include at least a first depth image captured at a first time from a first capture position, a second depth image captured at a second time from a second capture position different from the first capture position, and/or other depth images. The system may be configured to generate, by an inertial sensor, inertial signals that convey values of one or more inertial parameters characterizing motion of the depth sensor during the capture period of time. The processor(s) may be configured to select a target capture position based on one or more of the capture positions of the set of depth images. The processor(s) may be configured to generate, using the values of the one or more inertial parameters during the capture period of time, re-projected depth images. The re-projected depth images may include a first re-projected depth image, a second re-projected depth image, and/or other re-projected depth images. The first re-projected depth image may represent the depth information included in the first depth image as if the first depth image had been captured from the target capture position. The second re-projected depth image may represent the depth information included in the second depth image as if the second depth image had been captured from the target capture position. The processor(s) may be configured to generate a composite depth image by combining multiple depth images, such multiple depth images including the first re-projected depth image, the second re-projected depth image, and/or other depth images.

Another aspect of the present disclosure relates to a method for generating composite depth images, the method being implemented in a computer system that includes one or more hardware processors configured by machine-readable instructions. The method may include capturing, by a depth sensor, a set of depth images over a capture period of time. The set of depth images may include depth information. The depth information of the individual depth images may indicate distance from capture positions of the set of depth images to surfaces viewable from the capture positions. The set of depth images may include at least a first depth image captured at a first time from a first capture position, a second depth image captured at a second time from a second capture position different from the first capture position, and/or other depth images. The method may include generating, by an inertial sensor, inertial signals that convey values of one or more inertial parameters characterizing motion of the depth sensor during the capture period of time. The method may include selecting a target capture position based on one or more of the capture positions of the set of depth images. The method may include generating, using the values of the one or more inertial parameters during the capture period of time, re-projected depth images. The re-projected depth images may include a first re-projected depth image, a second re-projected depth image, and/or other re-projected depth images. The first re-projected depth image may represent the depth information included in the first depth image as if the first depth image had been captured from the target capture position. The second re-projected depth image may represent the depth information included in the second depth image as if the second depth image had been captured from the target capture position. The method may include generating a composite depth image by combining multiple depth images, such multiple depth images including the first re-projected depth image, the second re-projected depth image, and/or other depth images.

As used herein, any association (or relation, or reflection, or indication, or correspondency) involving servers, processors, client computing platforms, depth sensors, inertial sensors, depth images, inertial signals, inertial parameters, capture positions, re-projected depth images, composite depth images, rotational changes, positional changes, angular velocities, accelerations, median values, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
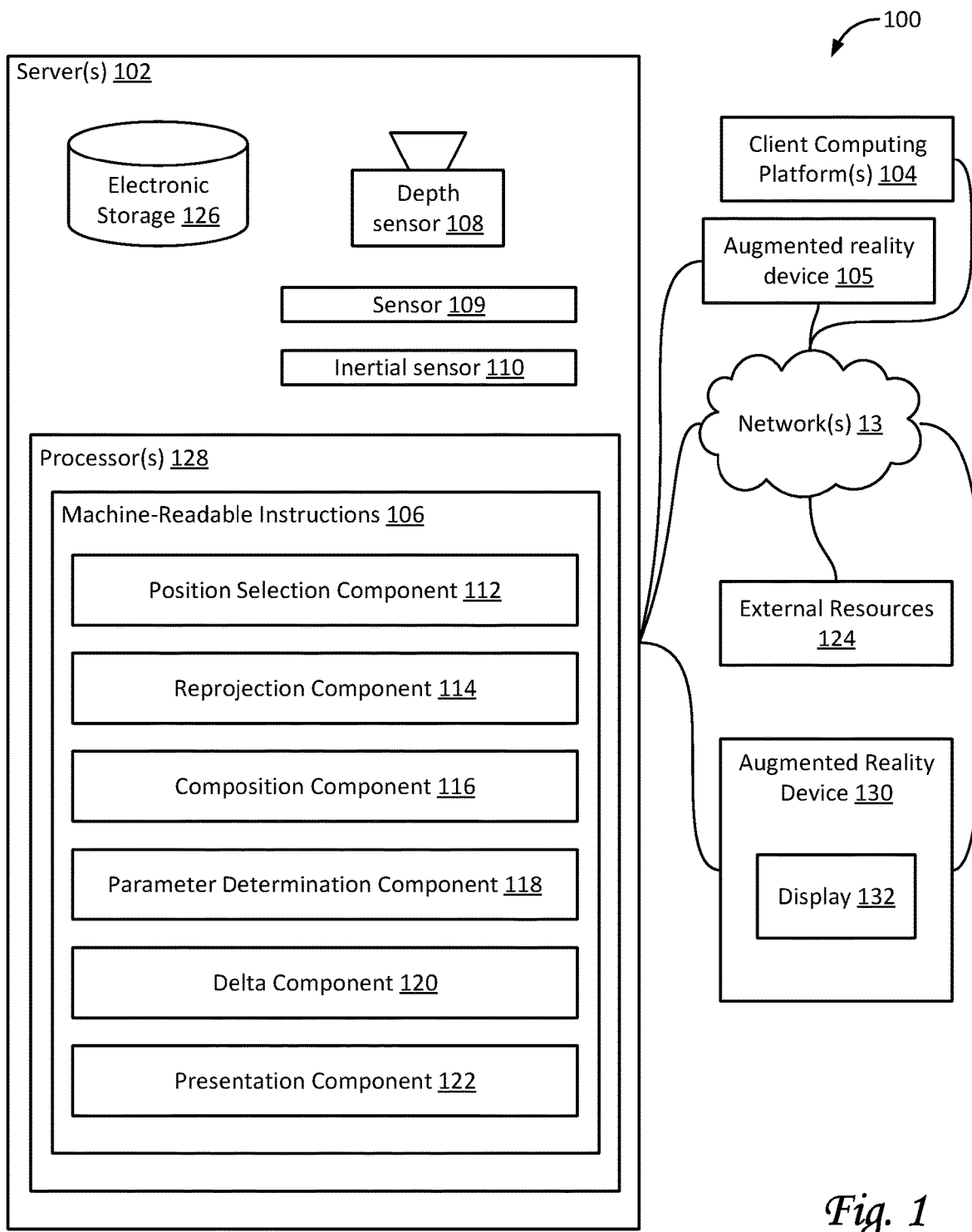
FIG. 1 shows a system configured for generating composite depth images, in accordance with one or more implementations.

FIG. 1 illustrates a system 100 configured for generating composite depth images, the method being implemented in a computer system that includes one or more hardware processors configured by machine-readable instructions, in accordance with one or more implementations. In some implementations, system 100 may include one or more of server(s) 102, a depth sensor 108, a sensor 109, an inertial sensor 110, electronic storage 126, processor(s) 128, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104. In some implementations, system 100 may include an augmented reality device 105.

Depth sensor 108 may be configured to capture depth images. In some implementations, depth sensor 108 may be configured to capture a set of depth images over a capture period of time and/or at a capture rate. Depth sensor 108 may be moving while capturing depth images. As depth sensor 108 moves, it may also rotate, e.g. in three dimensions. Individual depth images may be captured at or from a capture position. In some implementations, individual depth images may be captured at or from a particular orientation and/or rotation of depth sensor 108. The capture position may be a three-dimensional point in space. In some implementations, a capture position may be relative to one or more real-world objects. In some implementations, capture positions may be reflected by three-dimensional coordinates. In some implementations, one or more captured objects may be assumed to be stationary, or at least sufficiently stationary during the capture period of time such that the one or more captured objects have substantially not moved during the capture period of time. As depth sensor 108 moves, different depth images may be captured from different capture positions and/or angles. The set of depth images may include depth information, and/or other information. The depth information of individual depth images may indicate distance from capture positions of the set of depth images to surfaces (of real-world objects) that are viewable from the capture positions. The set of depth images may include one or more of a first depth image captured at a first time from a first capture position, a second depth image captured at a second time from a second capture position different from the first capture position, a third depth image captured at a third time from a third capture position different from the first capture position and the second capture position, and so forth. By way of non-limiting example, depth sensor 108 may be a consumer-grade depth sensor, such as the INTEL™ REALSENSE™ R200. In some implementations, individual depth images may include various types of errors and/or artefacts, including but not limited to missing depth information (e.g., holes in an image, e.g. from occlusions and/or reflections), noisy data, outliers, and/or other inaccuracies. By combining information from multiple depth images as described in this disclosure, composite depth images may be constructed that have fewer inaccuracies and/or higher quality than individual depth images. In some implementations, individual composite depth images may be smaller (i.e. take up less storage space) than the multiple depth images that were used to construct the composite depth image. In such a case, generating composite depth images may effectively act as data compression, in addition to improving the quality of the depth images.

Inertial sensor 110 may be configured to generate inertial signals that convey values of one or more inertial parameters. For example, the inertial parameters may pertain to motion of inertial sensor 110. In some implementations, inertial sensor 110 may be physically coupled to depth sensor 108, sensor 109, and/or another component of system 100. Accordingly, information from inertial sensor 110 may not only reflect motion of inertial sensor 110, but also of depth sensor 108, sensor 109, and/or another component of system 100. In some implementations, inertial sensor 110 may be configured to generate inertial signals that convey values of inertial parameters characterizing motion. For example, the motion may be motion of inertial sensor 110, depth sensor 108, sensor 109, and/or another component of system 100. In some implementations, the characterized motion may be limited to a particular period, e.g., the capture period of time of depth sensor 108, and/or another period of time. In some implementations, inertial sensor 110 may be configured to generate inertial signals at a particular rate. In some implementations, the rate of generation of inertial sensor 110 may be greater than the capture rate of depth sensor 108. By way of non-limiting example, in some implementations, the rate of generation of inertial sensor 110 may be ten times greater than the capture rate of depth sensor 108. Accordingly, multiple inertial values may be generated by inertial sensor 110 in the time between the captures of two subsequent depth images by depth sensor 108.

In some implementations, inertial sensor 110 may be an inertial measurement unit (IMU). In some implementations, inertial sensor 110 may include a gyroscope. In some implementations, the one or more inertial parameters may include angular velocity and/or a parameter based on or related to angular velocity. Alternatively, and/or simultaneously, in some implementations, inertial sensor 110 may include an accelerometer. In some implementations, the one or more inertial parameters may include acceleration and/or a parameter based on or related to acceleration. As used herein, acceleration may include two-dimensional acceleration, three-dimensional acceleration, angular acceleration, and/or other types of acceleration. For example, in some implementations, the inertial parameters may include one or more of yaw rate, roll rate, and/or pitch rate. In some implementations, the relative positions and/or orientations between inertial sensor 110, depth sensor 108, and/or other components of system 100 may be determined separately and/or prior to re-projections of depth images, e.g., through calibration. For example, an external system may remove the bias from the generated output signals by inertial sensor 110. In some implementations, such an external system may use a Kalman filter and/or other filters to filter and/or otherwise pre-process the generated output signals.

Sensor 109 may include, by way of non-limiting example, one or more of an image sensor, a camera, and/or another sensor. In some implementations, sensor 109 may be physically coupled to depth sensor 108, inertial sensor 110, and/or another component of system 100. Accordingly, information from inertial sensor 110 may not only reflect motion of inertial sensor 110, but also of sensor 109. For example, other sensors may include an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, a geolocation sensor, global positioning system sensors, a tilt sensor, a motion sensor, a vibration sensor, a distancing sensor, an ultrasonic sensor, an infrared sensor, a light sensor, a microphone, an air speed sensor, a ground speed sensor, an altitude sensor, degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, jerk, jounce, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of system 100.

As mentioned, sensor 109 may include image sensors, cameras, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Sensor 109 may be configured to capture information, including but not limited to visual information, video information, audio information, geolocation information, orientation and/or motion information, depth information, and/or other information. Information captured by sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer, GPS unit, and/or other sensor. Output signals generated by individual image sensors (and/or information based thereon) may be stored and/or transferred in electronic files.

In some implementations, an image sensor may be integrated with electronic storage such that captured information may be stored, at least initially, in integrated embedded storage. For example, a camera may include one or more image sensors and electronic storage media. In some implementations, an image sensor may be configured to transfer captured information to one or more components of system 100, including but not limited to remote electronic storage media, e.g. through "the cloud."

System 100 and/or server(s) 102 may be configured by machine-readable instructions 106. Machine-readable instructions 106 may include one or more instruction components. The instruction components may include computer program components. The instruction components may include one or more of a position selection component 112, a reprojection component 114, a composition component 116, a parameter determination component 118, a delta component 120, a presentation component 122, and/or other instruction components.

Position selection component 112 may be configured to select a target capture position. In some implementations, position selection component 112 may be configured to make a selection based on one or more of the capture positions of the set of depth images. The set of depth images may include 2, 3, 4, 5, 6, 7, 8, 9, 10, or more depth images. For example, in some cases where depth sensor 108 may have captured two depth images, position selection component 112 may select the target capture position such that the target capture position is between the capture positions of both depth images. As another example, in some cases where depth sensor 108 may have captured three depth images, position selection component 112 may select the target capture position such that the target capture position is the capture position of the center depth image. In some implementations, the target capture may coincide with a capture position of an individual depth image. In some implementations, the target capture image may be selected such that the total distance between the capture positions of a set of depth images and the target capture position is minimized.

Figure 3A:
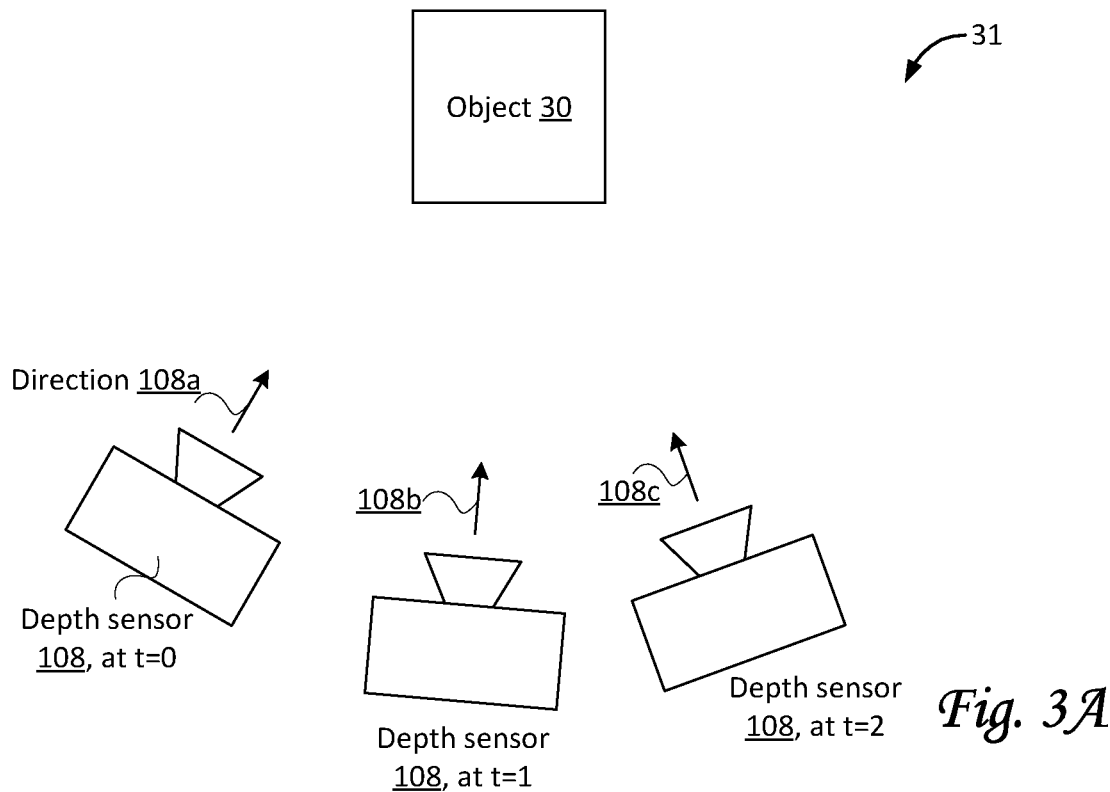
FIG. 3A-3B-3C illustrate exemplary scenarios for the use of a system configured for generating composite depth images, in accordance with one or more implementations.

By way of non-limiting example, FIG. 3A illustrates an exemplary scenario 31 for the use of system 100. Depth sensor 108 is depicted at three different moments, which are labeled as t=0, t=1, and t=2. First, at t=0, depth sensor 108 is positioned such that a depth image is captured in a direction 108a, as indicated by an arrow in FIG. 3A. This depth image may include depth information indicating distances from the capture position of depth sensor 108 at t=0 to surfaces of real-world objects including object 30 that are viewable from the capture position. A moment later, at t=1, depth sensor 108 is positioned such that another depth image is captured, this time in a direction 108b, as indicated by an arrow in FIG. 3A. This depth image may include depth information indicating distances from the capture position of depth sensor 108 at t=1 to surfaces of real-world objects including object 30 that are viewable from the capture position. A moment later, at t=2, depth sensor 108 is positioned such that another depth image is captured, this time in a direction 108c, as indicated by an arrow in FIG. 3A. This depth image may include depth information indicating distances from the capture position of depth sensor 108 at t=2 to surfaces of real-world objects including object 30 that are viewable from the capture position.

Figure 3B:
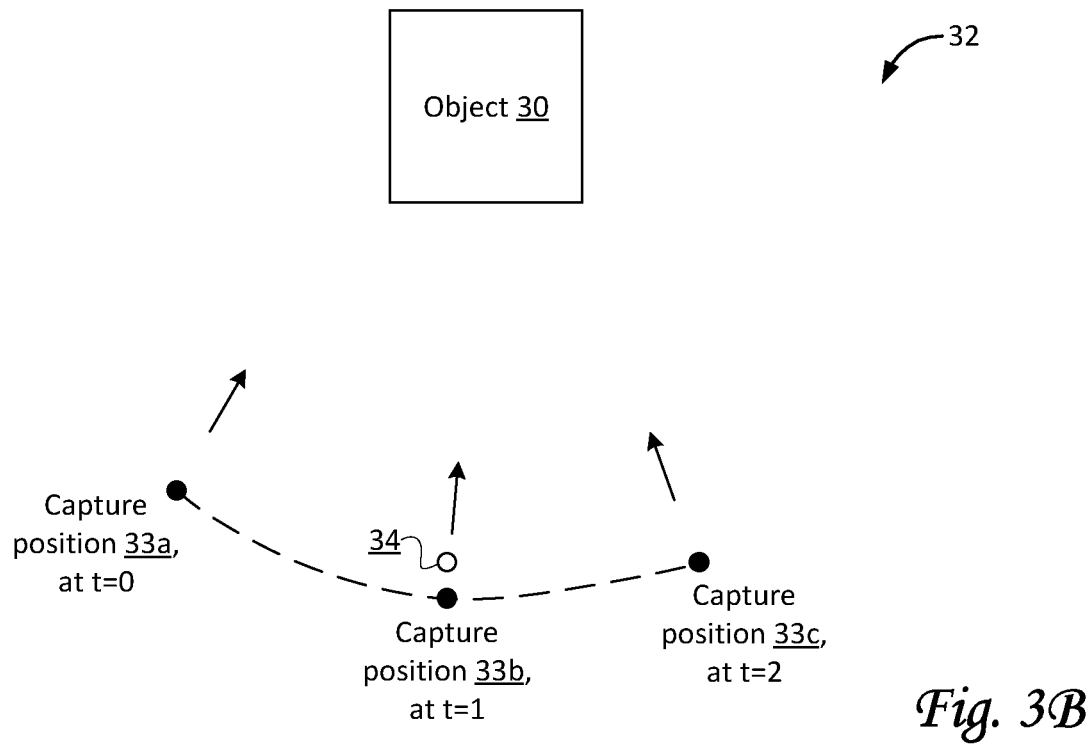

By way of non-limiting example, FIG. 3B illustrates an exemplary scenario 32 for the use of system 100, wherein exemplary scenario 32 is related to exemplary scenario 31 of FIG. 3A. In FIG. 3B, a capture position 33a corresponds to the capture position of depth sensor 108 at t=0 as depicted in FIG. 3A, a capture position 33b corresponds to the capture position of depth sensor 108 at t=1 as depicted in FIG. 3A, and a capture position 33c corresponds to the capture position of depth sensor 108 at t=2 as depicted in FIG. 3A. A position selection component similar to position selection component 112 in FIG. 1 may select a target capture position to be used to generate re-projected depth images. In some cases, the selected target capture position may coincide with one of the capture positions of depth sensor 108. For example, the selected target capture position may be capture position 33b. In some cases, the selected target capture position may not coincide with one of the capture positions of depth sensor 108. For example, the selected target capture position may be a position 34 that does not coincide with capture positions 33a-33b-33c.

Referring to FIG. 1, reprojection component 114 may be configured to generate re-projected depth images. In some implementations, reprojection component 114 may be configured to generate, using the values of the one or more inertial parameters during a particular period of time, re-projected depth images. The particular period of time may be the capture period of time of depth sensor 108. The re-projected depth images may include a first re-projected depth image, a second re-projected depth image, a third re-projected image, and so forth. A re-projected depth image (based on a particular depth image as captured from a particular capture position) may represent the depth information included in the particular depth image as if the particular depth image had been captured from a capture position that is different than the particular capture position. In particular, the re-projected depth image (based on the particular depth image as captured from the particular capture position) may represent the depth information included in the particular depth image as if the particular depth image had been captured from a target capture position that is selected by position selection component 112. Such re-projection may be based on the movement of depth sensor 108 between the different capture positions. For example, referring to FIG. 3A and FIG. 3B, and assuming (for the example in this paragraph) capture position 33b has been selected as the target capture position, a reprojection component similar to reprojection component 114 may generate a first re-projected depth image for the depth image captured at t=0 from capture position 33a, and a second re-projected depth image for the depth image captured at t=2 from capture position 33c. The first re-projected depth image may represent the depth information as captured at t=0 from capture position 33a as if this depth information had been captured from the target capture position at capture position 33b. The second re-projected depth image may represent the depth information as captured at t=2 from capture position 33c as if this depth information had been captured from the target capture position at capture position 33b. In some implementations, a re-projected depth image has the same coordinate system as the depth image at the target capture position.

Referring to FIG. 1, composition component 116 may be configured to generate composite depth images based on multiple depth images. In some implementations, composition component 116 may be configured to generate a composite depth image by combining multiple depth images. The multiple depth images may include one or more depth images as captured and/or one or more depth images as re-projected and/or generated by reprojection component 114. To illustrate, by continuing the example in the preceding paragraph and referring to FIG. 3A and FIG. 3B, a particular composite depth image may be based on combining the first re-projected depth image, the second re-projected depth image, and the depth image as captured at t=1 from capture position 33b. In some implementations, if the selected target capture position does not coincide with any particular capture position, composition component 116 may be configured to generate a composite depth image by combining only re-projected depth images.

In some implementations, individual pixels of the particular composite depth image may be generated and/or constructed by aggregating the individual pixels at the same coordinates of multiple depth images. For example, a particular individual pixel of the particular composite depth image may be constructed by averaging the values of the same pixels of the first re-projected depth image, the second re-projected depth image, and the depth image as captured at t=1 from capture position 33b. In some implementations, the particular individual pixel of the particular composite depth image may be constructed by determining the median value of the values of the same pixels of the first re-projected depth image, the second re-projected depth image, and the depth image as captured at t=1 from capture position 33b.

In some implementations, individual three-dimensional coordinates or points in space of the particular composite depth image may be generated and/or constructed by aggregating the individual three-dimensional coordinates or points in space of multiple depth images. For example, a particular individual point in space of the particular composite depth image may be constructed by averaging the values of the same point in space for the first re-projected depth image, the second re-projected depth image, and the depth image as captured at t=1 from capture position 33b. In some implementations, the particular individual point in space of the particular composite depth image may be constructed by determining the median value of the values of the same point in space of the first re-projected depth image, the second re-projected depth image, and the depth image as captured at t=1 from capture position 33b.

In some implementations, generating a composite depth image may be performed by removing outlier values before aggregating, averaging, and/or taking a median value for a particular coordinate. For example, generating the composite depth image may include filtering out the depth information (for a particular pixel or coordinate) from an individual depth image that is not supported by other depth images. For example, if a particular point in space is only present in one depth image, it may be ignored when generating the composite depth image, because that particular point likely represents an inaccuracy during capture. In some implementations, generating the composite depth image may include averaging the values from multiple (re-projected) depth images using Gaussian kernels.

Figure 4:
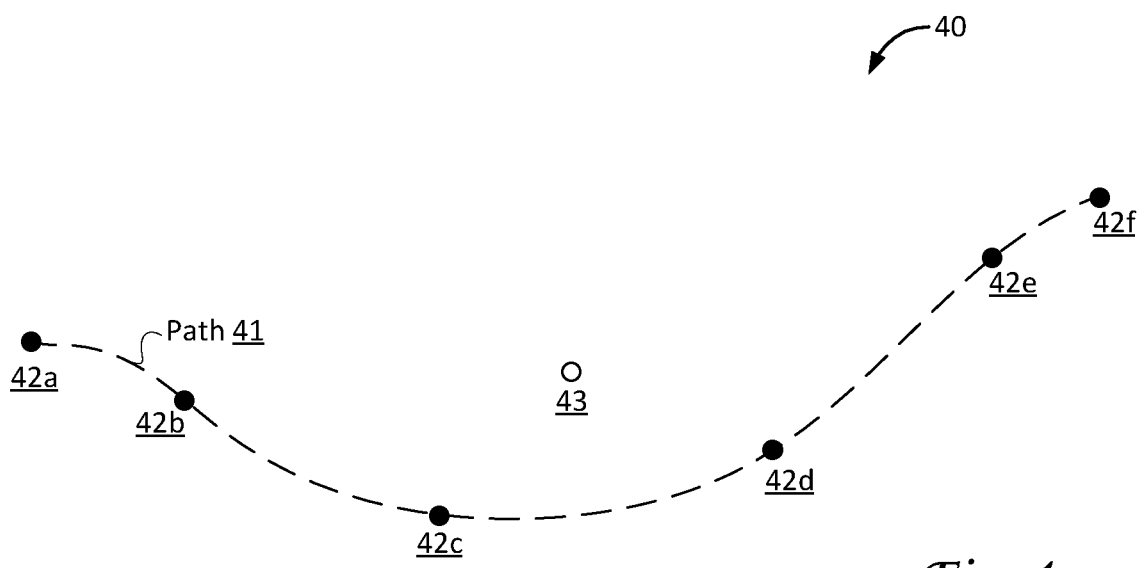
FIG. 4 illustrates an exemplary scenario for the use of a system configured for generating composite depth images, in accordance with one or more implementations.

By way of non-limiting example, FIG. 4 illustrates an exemplary scenario 40 for the use of system 100. A path 41 represents the movement in time of a depth sensor (not depicted). Along path 41, various capture positions represent the positions where a depth image has been captured, at a position 42a, a position 42b, a position 42c, a position 42d, a position 42e, and a position 42f. The use of six capture positions is exemplary, and not intended to be limiting in any way. Any one of these capture positions could be selected as the target capture position. In some implementations, a target capture position 43 may be selected that is not part of path 41, nor positioned on path 41. System 100 may be configured to generate re-projected depth images in such a case for multiple of the captured depth images at positions 42a-42b-42c-42d-42e-42f. Each of the re-projected depth images may have individual depth values for individual pixels and/or for individual coordinates. In some implementations, multiple values for each pixel may be averaged to construct a composite depth image. In some implementations, a median value of multiple values for each pixel may be used to construct the composite depth image. In some implementations, outlier values among the multiple values for each pixel may be discarded, and the remaining values may be either be averaged, or a median value may be determined. In some implementations, a weighted average may be used to average multiple values for each pixel (such that values from different positions have a different weight or importance in constructing the composite depth image).

For example, in some implementations, a factor for weight or importance may be based on a distance between a capture position and the target capture position.

Referring to FIG. 1, parameter determination component 118 may be configured to determine the one or more inertial parameters based on the inertial signals. In some implementations, parameter determination component 118 may determine a set of inertial parameters that correspond to an individual depth image as captured. For example, a first set of inertial parameters may correspond to a first depth image, a second set of inertial parameters may correspond to a second depth image, a third set of inertial parameters may correspond to a third depth image, and so forth. By way of non-limiting example, in some implementations, the inertial signals may convey values for angular velocity of inertial sensor 110. An individual depth image may be related to multiple values for angular velocity. Depending on the relative rates of operation between depth sensor 108 and inertial sensor 110, the individual depth image may be related to 5, 10, 15, 20, or more values for angular velocity. In some implementations, parameter determination component 118 may be configured to determine multiple values for the same type of parameter. Alternatively, and/or simultaneously, in some implementations, parameter determination component 118 may be configured to combine multiple values for a particular parameter into a different parameter, e.g., through integration. In some implementations, parameter determination component 118 may be configured to use strap down integration (SDI) to determine a particular parameter that corresponds to an individual depth image. By way of non-limiting example, in some implementations, the inertial signals may convey values for linear acceleration of inertial sensor 110. An individual depth image may be related to multiple values for linear acceleration.

Delta component 120 may be configured to determine changes between determinations of the same parameter (at different times). In some implementations, delta component 120 may be configured to determine rotational changes, including but not limited to changes in rotation of inertial sensor 110 and/or depth sensor 108. In some implementations, delta component 120 may be configured to determine positional changes, including but not limited to changes in position of inertial sensor 110 and/or depth sensor 108. Determinations by delta component 120 may be based on results from parameter determination component 118, inertial signals generated by inertial sensor 110, and/or other information. For example, a rotational change may be based on a first rotation (at a first moment and/or position) and a second rotation (at a second moment and/or position). For example, a positional change may be based on a first position (at a first moment) and a second position (at a second moment). In some implementations, delta component 120 may be configured to determine changes relative to the target capture position and/or a rotation at the target capture position. In some implementations, composition component 116 may be configured to generate re-projected depth images based on one or more of a rotational change and/or a positional change. For example, a first re-projected depth image may be based on a first rotational change, a second re-projected depth image may be based on a second rotational change, and so forth.

Figure 3C:
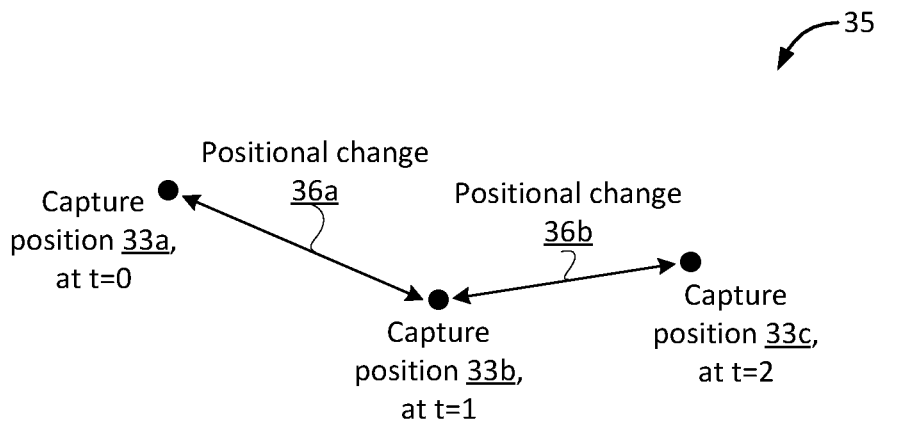

By way of non-limiting example, FIG. 3C illustrates an exemplary scenario 35 for the use of system 100, wherein exemplary scenario 35 is related to exemplary scenario 31 of FIG. 3A and exemplary scenario 32 of FIG. 3B. In FIG. 3C, a capture position 33a corresponds to the capture position of depth sensor 108 at t=0 as depicted in FIG. 3A, a capture position 33b corresponds to the capture position of depth sensor 108 at t=1 as depicted in FIG. 3A, and a capture position 33c corresponds to the capture position of depth sensor 108 at t=2 as depicted in FIG. 3A. Assume, for the example in this paragraph, that capture position 33b has been selected as the target capture position. A delta component similar to delta component 120 in FIG. 1 may determine a first positional change 36a between capture position 33a and capture position 33b. Furthermore, the delta component may determine a second positional change 36b between capture position 33b and capture position 33c. For example, generation of a first re-projected depth image may be based on first positional change 36a, generation of a second re-projected depth image may be based on second positional change 36b, and so forth.

Referring to FIG. 1, presentation component 122 may be configured to present images on a display of augmented reality device 105 to a user. In some implementations, images may be presented to the user such that the user can view reality and the images simultaneously. The images may be based at least in part on information included in one or more composite depth images.

In some implementations, server(s) 102, client computing platform(s) 104, and/or external resources 124 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 124 may be operatively linked via some other communication media.

A given client computing platform 104 may include one or more processors configured to execute computer program components. The computer program components may be configured to enable an expert or user associated with the given client computing platform 104 to interface with system 100 and/or external resources 124, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, an augmented reality device, and/or other computing platforms.

External resources 124 may include sources of information outside of system 100, external entities participating with system 100, and/or other resources. In some implementations, some or all of the functionality attributed herein to external resources 124 may be provided by resources included in system 100.

Server(s) 102 may include electronic storage 126, one or more processors 128, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 126 may comprise non-transitory storage media that electronically stores information. The electronic storage media of electronic storage 126 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 126 may include one or more virtual storage resources (e.g., cloud storage, a virtual private network, and/or other virtual storage resources). Electronic storage 126 may store software algorithms, information determined by processor(s) 128, information received from server(s) 102, information received from client computing platform(s) 104, and/or other information that enables server(s) 102 to function as described herein.

Processor(s) 128 may be configured to provide information processing capabilities in server(s) 102. As such, processor(s) 128 may include one or more of a digital processor, an analog processor, a digital circuit designed to process information, an analog circuit designed to process information, a state machine, and/or other mechanisms for electronically processing information. Although processor(s) 128 is shown in FIG. 1 as a single entity, this is for illustrative purposes only. In some implementations, processor(s) 128 may include a plurality of processing units. These processing units may be physically located within the same device, or processor(s) 128 may represent processing functionality of a plurality of devices operating in coordination. Processor(s) 128 may be configured to execute components 112, 114, 116, 118, 120, and/or 122, and/or other components. Processor(s) 128 may be configured to execute components 112, 114, 116, 118, 120, and/or 122, and/or other components by software; hardware; firmware; some combination of software, hardware, and/or firmware; and/or other mechanisms for configuring processing capabilities on processor(s) 128. As used herein, the term "component" may refer to any component or set of components that perform the functionality attributed to the component. This may include one or more hardware processors during execution of processor readable instructions, the processor readable instructions, circuitry, hardware, storage media, or any other components.

It should be appreciated that although components 112, 114, 116, 118, 120, and/or 122 are illustrated in FIG. 1 as being implemented within a single processing unit, in implementations in which processor(s) 128 includes multiple processing units, one or more of components 112, 114, 116, 118, 120, and/or 122 may be implemented remotely from the other components. The description of the functionality provided by the different components 112, 114, 116, 118, 120, and/or 122 described below is for illustrative purposes, and is not intended to be limiting, as any of components 112, 114, 116, 118, 120, and/or 122 may provide more or less functionality than is described. For example, one or more of components 112, 114, 116, 118, 120, and/or 122 may be eliminated, and some or all of its functionality may be provided by other ones of components 112, 114, 116, 118, 120, and/or 122. As another example, processor(s) 128 may be configured to execute one or more additional components that may perform some or all of the functionality attributed below to one of components 112, 114, 116, 118, 120, and/or 122.

Figure 2:
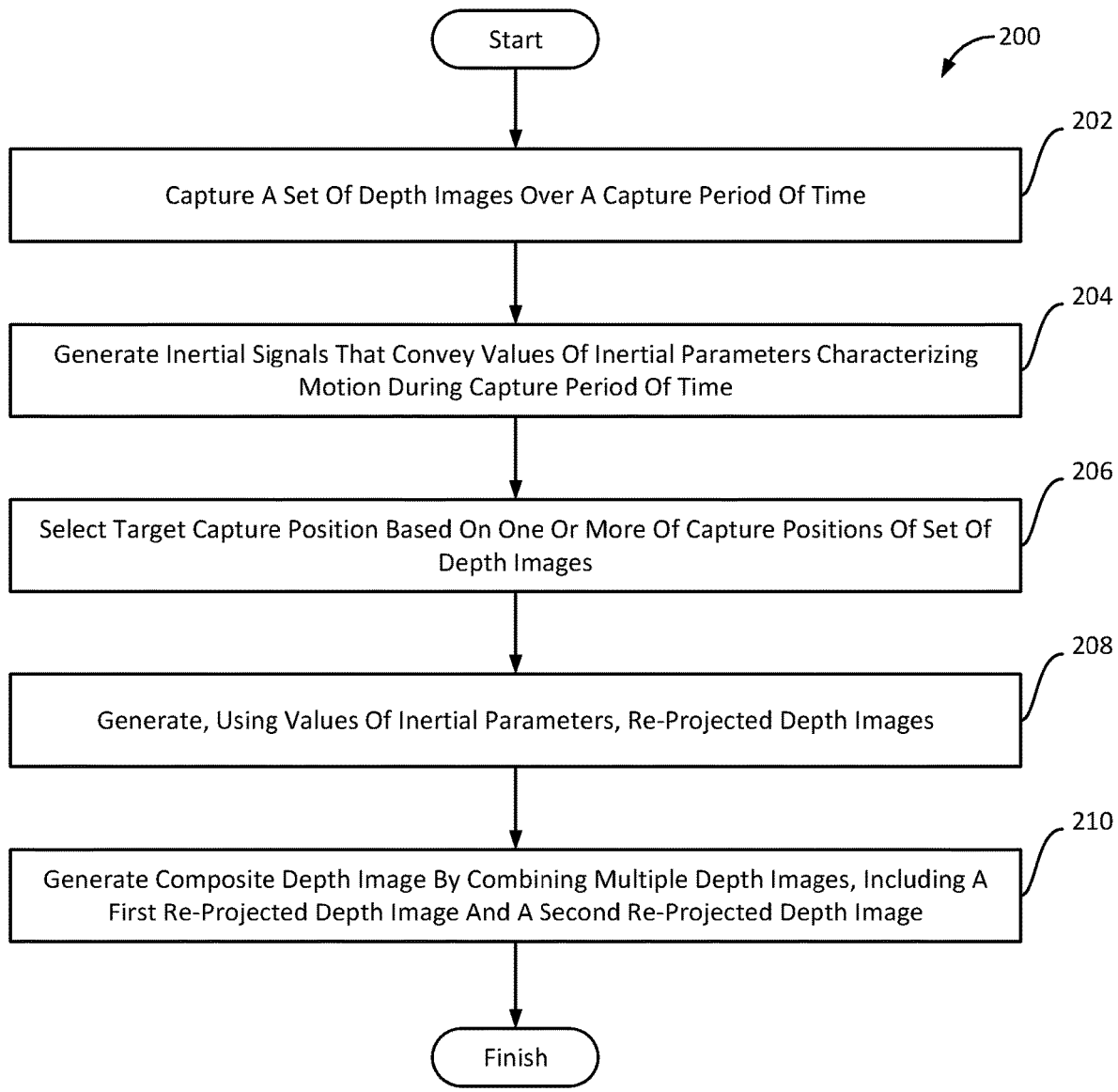
FIG. 2 includes a flow chart of a method for generating composite depth images, in accordance with one or more implementations.

FIG. 2 illustrates a method 200 for generating composite depth images, the method being implemented in a computer system that includes one or more hardware processors configured by machine-readable instructions, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include capturing a set of depth images over a capture period of time. The set of depth images may include depth information. The depth information of the individual depth images may indicate distance from capture positions of the set of depth images to surfaces viewable from the capture positions. The set of depth images may include at least a first depth image captured at a first time from a first capture position, and a second depth image captured at a second time from a second capture position different from the first capture position. Operation 202 may be performed by a depth sensor that is the same as or similar to depth sensor 108, in accordance with one or more implementations.

An operation 204 may include generating inertial signals that convey values of one or more inertial parameters characterizing motion of the depth sensor during the capture period of time. Operation 204 may be performed by an inertial sensor that is the same as or similar to inertial sensor 110, in accordance with one or more implementations.

An operation 206 may include selecting a target capture position based on one or more of the capture positions of the set of depth images. Operation 206 may be performed by one or more hardware processors configured by machine-readable instructions including a component that is the same as or similar to position selection component 112, in accordance with one or more implementations.

An operation 208 may include generating, using the values of the one or more inertial parameters during the capture period of time, re-projected depth images. The re-projected depth images may include a first re-projected depth image and a second re-projected depth image. The first re-projected depth image may represent the depth information included in the first depth image as if the first depth image had been captured from the target capture position. The second re-projected depth image may represent the depth information included in the second depth image as if the second depth image had been captured from the target capture position. Operation 208 may be performed by one or more hardware processors configured by machine-readable instructions including a component that is the same as or similar to reprojection component 114, in accordance with one or more implementations.

An operation 210 may include generating a composite depth image by combining multiple depth images, such multiple depth images including the first re-projected depth image and the second re-projected depth image. Operation 210 may be performed by one or more hardware processors configured by machine-readable instructions including a component that is the same as or similar to depth image component 116, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate composite depth images, the system comprising:
   a depth sensor configured to capture a set of depth images over a capture period of time, the set of depth images including depth information, the depth information of the individual depth images indicating distance from capture positions of the set of depth images to surfaces viewable from the capture positions, wherein the set of depth images includes at least a first depth image captured from a first capture position, and a second depth image captured from a second capture position that is different from the first capture position;
   an inertial sensor configured to generate inertial signals that convey values of one or more inertial parameters characterizing motion of the depth sensor during the capture period of time; and
   one or more hardware processors configured by machine-readable instructions to:
   select a target capture position based on one or more of the capture positions of the set of depth images;
   generate, using the values of the one or more inertial parameters, a first re-projected depth image representing the depth information included in the first depth image as if the first depth image had been captured from the target capture position;
   generate, using the values of the one or more inertial parameters, a second re-projected depth image representing the depth information included in the second depth image as if the second depth image had been captured from the target capture position; and
   generate a composite depth image by combining multiple depth images, such multiple depth images including one or both of the first re-projected depth image and the second re-projected depth image.

2. The system of claim 1, wherein the set of depth images further includes a third depth image captured at a third time from a third capture position different from the first capture position and the second capture position, wherein the target capture position is the third capture position, and wherein generating the composite depth image is further based on the third depth image.

3. The system of claim 2, wherein generating the composite depth image by combining multiple depth images is based on median values corresponding to a particular three-dimensional point in space, wherein the median values are based on multiple depth images.

4. The method of claim 3, further comprising:
   presenting images on a display of an augmented reality device to a user such that the user can view reality and the images simultaneously, wherein the images are based at least in part on information included in the composite depth image.

5. The system of claim 1, further comprising a sensor attached to the depth sensor, wherein the sensor has a particular position, wherein the target capture position is the particular position of the sensor.

6. The system of claim 1, wherein the one or more hardware processors are further configured by machine-readable instructions to:
   determine the one or more inertial parameters based on the inertial signals, wherein the one or more inertial parameters include a first set of inertial parameters that correspond to the first depth image, and a second set of inertial parameters that correspond to the second depth image;
   determine a first rotational change between a rotation of the depth sensor at the target capture position and a first rotation of the depth sensor at the first capture position based on the first set of inertial values; and
   determine a second rotational change between the rotation of the depth sensor at the target capture position and a second rotation of the depth sensor at the second capture position based on the second set of inertial values;
   wherein generation of the first re-projected depth image is based on the first rotational change, and wherein generation of the second re-projected depth image is based on the second rotational change.

7. The system of claim 6, wherein the one or more hardware processors are further configured by machine-readable instructions to:
   determine a first positional change between the target capture position and the first capture position based on the first set of inertial parameters;
   determine a second positional change between the target capture position and the second capture position based on the second set of inertial parameters;
   wherein generation of the first re-projected depth image is further based on the first positional change, and wherein generation of the second re-projected depth image is further based on the second positional change.

8. The system of claim 1, wherein the inertial sensor includes either a gyroscope or an accelerometer, and wherein the one or more inertial parameters include either angular velocity or acceleration, respectively.

9. The system of claim 1, wherein an individual value from the one or more inertial parameters corresponds to the target capture position.

10. The system of claim 1, wherein generating the composite depth image includes aggregating depth information corresponding to a particular three-dimensional point in space from the first depth image with depth information from the second depth image that corresponds to the same particular three-dimensional point in space.

11. The system of claim 10, wherein aggregating the depth information is based on weighted averages of values from multiple depth images.

12. The system of claim 1, wherein generating the composite depth image includes filtering out the depth information from an individual depth image that is not supported by the depth information from other depth images.

13. The system of claim 1, further comprising an augmented reality device including a display, wherein the one or more hardware processors are further configured by machine readable instructions to:

present images on the display to a user such that the user can view reality and the images simultaneously, wherein the images are based at least in part on information included in the composite depth image.

14. A computer-implemented method for generating composite depth images, the method being implemented in a computer system that includes one or more hardware processors configured by machine-readable instructions, the method comprising:

capturing, by a depth sensor, a set of depth images over a capture period of time, the set of depth images including depth information, the depth information of the individual depth images indicating distance from capture positions of the set of depth images to surfaces viewable from the capture positions, wherein the set of depth images includes at least a first depth image captured from a first capture position, and a second depth image captured from a second capture position that is different from the first capture position;

generating, by an inertial sensor, inertial signals that convey values of one or more inertial parameters characterizing motion of the depth sensor during the capture period of time;

selecting a target capture position based on one or more of the capture positions of the set of depth images;

generating, using the values of the one or more inertial parameters, re-projected depth images, wherein the re-projected depth images include a first re-projected depth image and a second re-projected depth image, wherein the first re-projected depth image represents the depth information included in the first depth image as if the first depth image had been captured from the target capture position, and wherein the second re-projected depth image represents the depth information included in the second depth image as if the second depth image had been captured from the target capture position; and generating a composite depth image by combining multiple depth images, such multiple depth images including one or both of the first re-projected depth image and the second re-projected depth image.

15. The method of claim 14, further comprising:

determining the one or more inertial parameters based on the inertial signals, wherein the one or more inertial parameters include a first set of inertial parameters that correspond to the first depth image, and a second set of inertial parameters that correspond to the second depth image; and determining rotational changes, wherein the rotational changes include a first rotational change and a second rotational change, wherein the first rotational change between a rotation of the depth sensor at the target capture position and a first rotation of the depth sensor at the first capture position is based on the first set of inertial values, and wherein the second rotational change between the rotation of the depth sensor at the target capture position and a second rotation of the depth sensor at the second capture position is based on the second set of inertial values;

wherein generating the first re-projected depth image is based on the first rotational change, and wherein generating the second re-projected depth image is based on the second rotational change.

16. The method of claim 15, further comprising:

determining positional changes, wherein the positional changes include a first positional change and a second positional change, wherein the first positional change between the target capture position and the first capture position is based on the first set of inertial parameters, and wherein the second positional change between the target capture position and the second capture position is based on the second set of inertial parameters;

wherein generating the first re-projected depth image is further based on the first positional change, and wherein generating the second re-projected depth image is further based on the second positional change.

17. The method of claim 14, wherein the inertial sensor includes either a gyroscope or an accelerometer, and wherein the one or more inertial parameters include either angular velocity or acceleration, respectively.

18. The method of claim 14, wherein generating the composite depth image includes aggregating depth information corresponding to a particular three-dimensional point in space from the first depth image with depth information from the second depth image that corresponds to the same particular three-dimensional point in space.

19. The method of claim 14, wherein the set of depth images further includes a third depth image captured at a third time from a third capture position different from the first capture position and the second capture position, wherein the target capture position is the third capture position, and wherein generating the composite depth image is further based on the third depth image.

20. The method of claim 19, wherein generating the composite depth image by combining multiple depth images is based on median values corresponding to a particular three-dimensional point in space, wherein the median values are based on multiple depth images.

21. The method of claim 19, wherein generating the composite depth image includes filtering out the depth information from an individual depth image that is not supported by the depth information from other depth images.

* * * * *